(12) United States Patent
Schenk

(10) Patent No.: US 7,972,197 B2
(45) Date of Patent: Jul. 5, 2011

(54) GRINDING MACHINE FOR GRINDING OF A GEAR

(75) Inventor: Thomas Schenk, Coburg (DE)

(73) Assignee: Kapp GmbH, Coburg (DE)

( * ) Notice: Subject to any disclaimer, the term of this patent is extended or adjusted under 35 U.S.C. 154(b) by 547 days.

(21) Appl. No.: 12/109,563

(22) Filed: Apr. 25, 2008

(65) Prior Publication Data

US 2008/0268756 A1     Oct. 30, 2008

(30) Foreign Application Priority Data

Apr. 27, 2007   (DE) .................... 20 2007 006 219

(51) Int. Cl.
*B24B 19/00* (2006.01)
*B23F 1/02* (2006.01)

(52) U.S. Cl. .......................................... 451/11; 451/47

(58) Field of Classification Search ............... 451/47, 451/5, 11, 56, 72, 443; 125/11.03
See application file for complete search history.

(56) References Cited

U.S. PATENT DOCUMENTS

| 4,993,194 | A  | * | 2/1991  | Cadisch .................... 451/253 |
| 5,033,239 | A  | * | 7/1991  | Phillips .................... 451/48 |
| 6,234,880 | B1 | * | 5/2001  | Scacchi .................... 451/47 |
| 6,491,568 | B1 | * | 12/2002 | Jankowski ................. 451/5 |
| 7,121,930 | B2 | * | 10/2006 | Thyssen .................... 451/56 |

\* cited by examiner

*Primary Examiner* — Robert Rose
(74) *Attorney, Agent, or Firm* — Lucas & Mercanti, LLP

(57) ABSTRACT

The invention relates to a grinding machine for grinding of a gear or of a gear-like workpiece, which has a grinding worm (1) with a tooth-shaped profile (2), which consists at least partly from a dressable abrasive material and which is arranged rotatably on a grinding spindle, so that it can rotate around an axis of rotation (C) during grinding and a dressing device (3), with which at least a part of the forming areas (4, 5) of the grinding worm (1) can be profiled, wherein the dressing device (3) has a dressing spindle (6), which bears a disk-shaped dressing tool (7), so that it can rotate around an axis of rotation (B). To allow a faster dressing of the grinding worm the invention is characterized in that the grinding machine further has a dressing bar (8) which has a dressing edge (9), wherein the form of the dressing edge (9) corresponds at least partly to the ideal envelope of the grinding worm (1).

14 Claims, 4 Drawing Sheets

GRINDING MACHINE FOR GRINDING OF A GEAR

Figure 1:
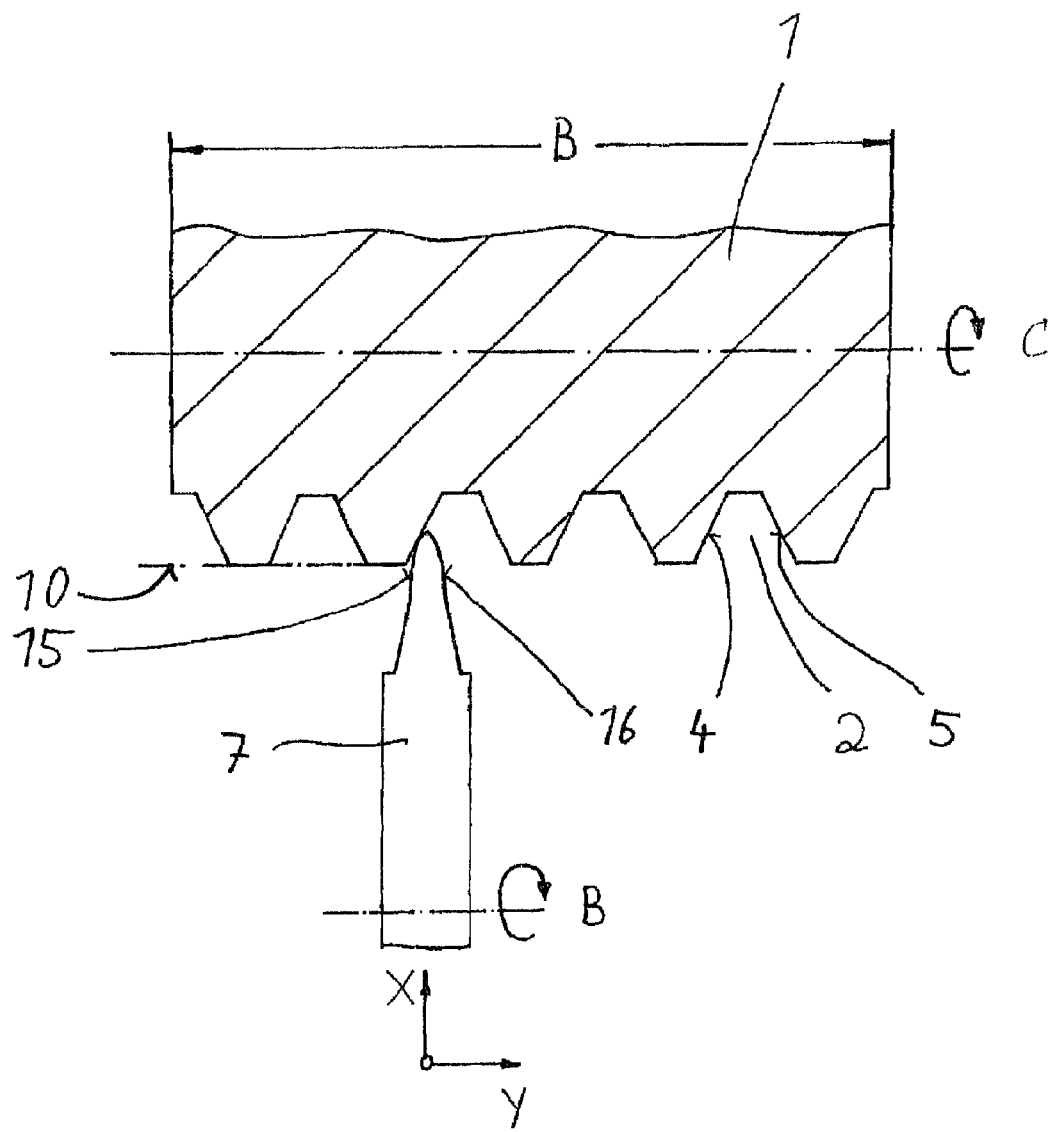

The invention relates to a grinding machine for grinding of a gear or of a gear-like workpiece, which has a grinding worm with a tooth-shaped profile, which consists at least partly from a dressable abrasive material and which is arranged rotatably on a grinding spindle, so that it can rotate around an axis of rotation during grinding and a dressing device, with which at least a part of the forming areas of the grinding worm can be profiled, wherein the dressing device has a dressing spindle, which bears a disk-shaped dressing tool, so that it can rotate around an axis of rotation.

In the production of gears the final process of manufacturing has a major relevance. During the final process of manufacturing the flanks of the tooth are grinded, by which they are brought to the exact contour. Often, corrections of the profile are desired which go beyond the form of the tooth involute to influence the operation of the gearing positively.

An efficient method for producing the gearing is the generative grinding by means of a grinding worm. Here, the gear to be machined is in contact with the grinding worn, so that an allowance on the tooth flanks is removed by the abrasive material of the grinding worm.

To ensure a sufficient quality of the gearing the working areas of the grinding wormy (i.e. the tooth-shaped profile of the grinding worm) must be brought again to the desired shape after a certain number of grinded workpieces. For this a dressing process is necessary, for which a profile dressing method or a dressing process with dressing line by line can be employed. In the case of profile dressing the dressing tool has fine contact with the flanks of the tooth-shaped profile of the grinding tool, whereas in the case of dressing line by line a punctual contact is given.

The dressing tool which is employed for the dressing of the grinding worm has not only to dress the tooth-shaped profile, i.e. the thread, of the grinding worm. It is also necessary at least in certain time intervals to dress the outer circumferential area of the grinding wore, i.e. its envelope. So, the tooth crest of the grinding worm and its grinding profile respectively is dressed.

Generally, for dressing of the tooth crest it is possible to employ the desk-shaped dressing tool. However, some disadvantages come along with this.

Regardless, if the dressing of the forming areas of the grinding worm is done with the profile dressing or by dressing with punctual contact, the dressing of the tooth crest is an additional working step, in which the disk-shaped tool—at least in the case of a cylindrical grinding worm—is guided in the direction of the axis of rotation of the grinding worm, to dress the envelope of the grinding wont. This requires a respective time, what reduces the cost effectiveness of the grinding process. Furthermore, a disk-shaped dressing tool is not optimally applicable for the dressing of the envelope of the grinding worm.

Thus, it is an object of the present invention to further develop a grinding machine of the kind mentioned above, so that the dressing of the grinding worm can be carried out faster but however accurately, wherein it is aimed to obtain a high degree of flexibility for the dressing process.

The solution of this object according to the invention is characterized in that the grinding machine further has a dressing bar, which has a dressing edge, wherein the form of the dressing edge corresponds at least partly to the ideal envelope of the grinding worm.

Preferable, the dressing bar is arranged at the dressing device. But this is not mandatory. It can be mounted in the machining room anywhere, unless the infeed of the grinding worm is possible there.

Preferably, the dressing bar has a length which is at least the width of the grinding worm. Because in this case it is possible to dress the whole tip region of the grinding worm with one single process step and thus in a very short time by only one infeed of the dressing bar.

The dressing bar can have a straight dressing edge, what is recommendable in the case of a cylindrical grinding worm. In general, it is also possible that the dressing bar has an arcuated dressing edge; this is advisable in the case of a globoidical grinding worm.

The dressing device and/or the grinding spindle can be arranged on a slide, which allows to move the dressing edge to the outer circumferential area of the grinding worm. Here, the slide can allow to move the dressing edge, while it is directed into the direction of the axis or rotation, i.e. that the dressing edge is arranged parallel to the axis of rotation of the grinding spindle.

Preferably, the dressing bar can have a rectangular shape in its cross section. The dressing device can have at least two contact surfaces for the dressing bar in a face side region. Furthermore, it can have a clamping device for clamping of the dressing bar.

Preferable, the dressing bar consists of poly-crystalline diamond (PKD).

The disk-shaped dressing tool can have such a profile, so that during the dressing of the forming areas of the grinding worm a substantial punctual contact is given between the dressing tool and the grinding worm.

Thus, the invention suggests in addition to the disk-shaped dressing tool a dressing bar, by which the tip region of the tooth-shaped profile is dressed.

This requires only a fractional amount of the time, which would be required by a topological dressing tool to dress the tip of the profile.

Preferably, the grinding tool is a single-thread or a multiple-thread grinding worm for grinding of a gear by the method of generative grinding.

With the suggested grinding machine it becomes possible, to carry out the dressing process in a substantial shorter time with the same quality, as the whole tip of the tooth-shaped profile of the grinding worm can be dressed in a very short time by means of the dressing bar (or dressing lineal or dressing spacer) by one single infeed into the direction radially to the grinding worm. By doing so, the cost effectiveness of the grinding is substantially increased.

In the drawing an embodiment of the invention is depicted.

Figure 2:
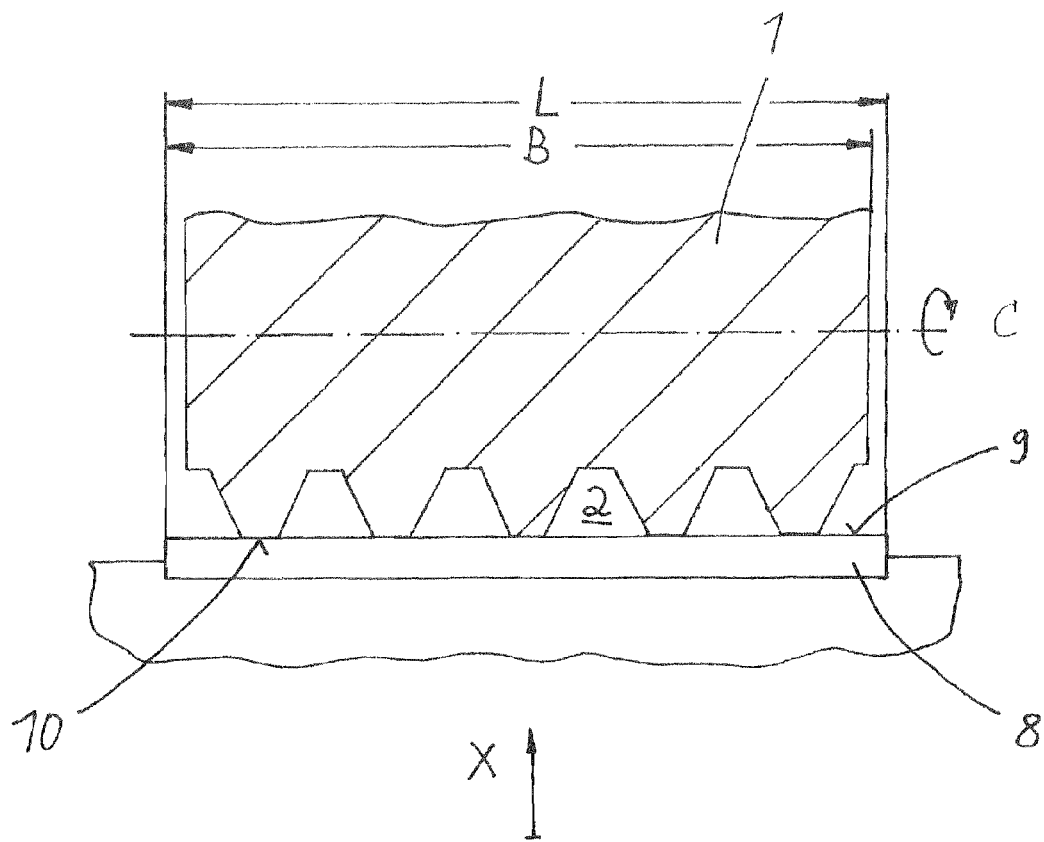
Figure 3:
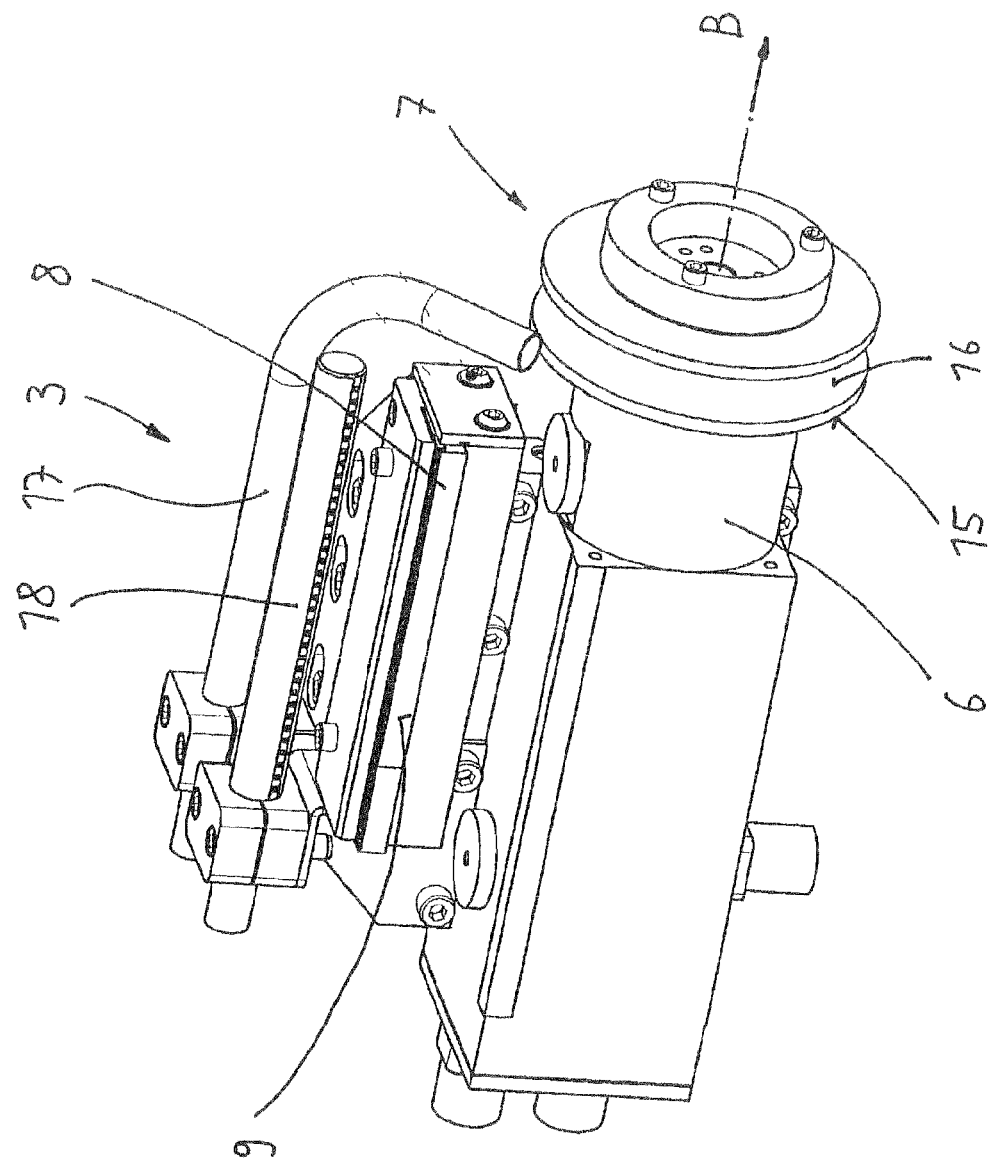
Figure 4:
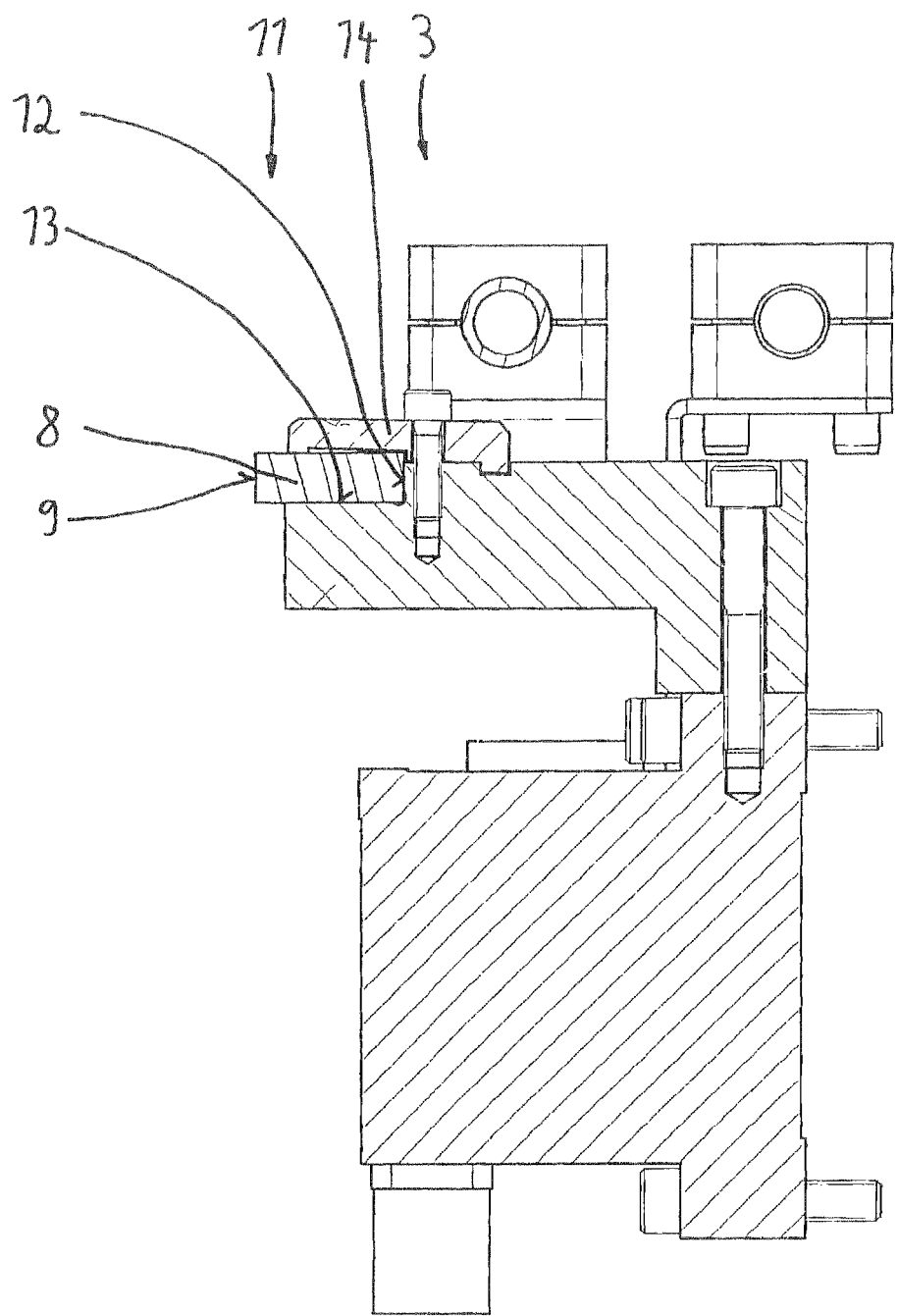

FIG. 1 shows an axial section of a grinding worm during the dressing of its tooth-shaped profile with a disk-shaped dressing tool, FIG. 2 shows an axial section of a grinding worm during the dressing of the tip of the tooth-shaped profile of the grinding worm by means of a dressing bar, FIG. 3 shows in a perspective view of a dressing device for dressing of the tooth-shaped profile as well as of the tip of the grinding worm and FIG. 4 shows a section of the dressing device according to FIG. 3, wherein the plane of section is perpendicular to the axis of rotation of the dressing spindle.

In FIG. 1 the pre-known line by line dressing of a grinding tool 1 being a grinding worm is shown. The grinding worm 1 has a tooth-shaped profile 2 in the axial section, which is defined or bordered respectively by two flanks 4 and 5. The first flank 4 and also the second flank 5 have a substantial linear form in an axial section, but corrections are superposed to the substantial linear form, to obtain a corresponding counter profile at the finished, grinded gear. Both flanks 4 and 5 are arranged opposing each other—as can be seen.

To make sure that the tooth-shaped profile 2 has the desired precise form a dressing process is necessary, for which a disk-shaped dressing tool 7 is arranged. The dressing tool 7 has the depicted form according to FIG. 1 in an axial section, i.e. it has a first abrasive area 15 and a second abrasive area 16, which are arranged for the co-operation with the first flank 4 and with the second flank 5 respectively.

During the dressing process the grinding worm 1 rotates around the axis of rotation C and the rotation-symmetrical dressing tool 7 rotates around the axis of rotation B. When rotation around the axes B, C is established, the working region of the dressing tool 7, which is equipped with the abrasive areas 15, 16, is "contrived" into the worm thread of the grinding worm 1, i.e. the dressing tool 7 is moved in axial direction Y in dependence from the pitch of the worm and the rotational speed of the grinding worm 1. By doing so, at first the first flank 4 and then the second flank 5 are profiled line by line. I.e. after respective axial passes the dressing tool 7 is moved relatively to the grinding worm 1 radially in the direction of the infeed coordinate X, until the tooth-shaped profile 2 is dressed along its entire height.

While the tip of the tooth-shaped profile 2, i.e. the outer circumferential area 10 of the grinding worm 1, can generally be dressed by means of the disk-shaped dressing tool, the invention suggest another solution.

As can be seen in FIG. 2 the dressing of the outer circumferential area 10, i.e. of the envelope of the grinding worm 1, takes place by means of a dressing bar 8, which has a dressing edge 9. The dressing edge 9 is straight in the shown embodiment—corresponding to the cylindrical form of the grinding worm 1. For globoidal grinding worms also an arcuated shape of the dressing edge 9 could be used in general. The dressing of the tip of the gear occurs by infeeding the dressing bar 8 in direction X by a defined amount, so that by a single process step the tip of the whole grinding worm 1 is dressed.

To allow this, the length L of the dressing bar 8 is at least as long as the width B of the grinding worm 1, i.e. the dressing bar 8 covers the whole width of the worm.

Details of the device can be seen in the FIGS. 3 and 4.

The dressing device 3, which can be seen in FIGS. 3 and 4, is mounted into a grinding machine, and—more specifically—it is mounted on a slide, so that it can be moved into the mentioned directions X and Y relatively to the grinding worm 1. Alternatively of additively it is also possible that the grinding worm is arranged on a slide. It is essential, that the possibility exists that a relative translatorical movement between the grinding worm and the dressing tools can take place.

For dressing of the tooth-shaped profile 2 of the grinding worm 1, the dressing device 3 has a dressing spindle 6, which bears the disk-shaped dressing tool 7, wherein this can rotate during dressing around the axis B. In FIG. 3 a dressing tool 7 is depicted which has two adjacent dressing disks (in distinction to the schematic illustration according to FIG. 1).

Beside the dressing spindle 6 with the disk-shaped dressing tool 7 the dressing device 3 furthermore has the dressing bar 8, which has the dressing edge 9. As can be seen best in FIG. 4, the dressing bar 8 is arranged in a face side region 11 of the dressing device 3. It is held by a clamping device 14, which clamps the dressing bar 8, after it is aligned at two contact surfaces 12 and 13 of the dressing device.

Thus, during the dressing of the tip region of the tooth-shaped profile 2 by means of the dressing bar 8 the tip region is completely dressed by an infeed movement of the bar perpendicular to the axis of the grinding tool in a single process step, wherein the dressing bar 8 is equipped with the straight dressing edge 9, wherein the dressing bar 9 and the dressing edge 9 stay parallel to the axis C.

Preferably, the dressing bar 8 consists of poly-crystalline diamond (PKD). This is a synthetic produced, extremely ductile and enmeshed mass of diamond particles with random orientation in a metallic matrix. It is produced at high pressure and high temperatures by sintering of selected diamond particles. The sintering process is controlled within the stable region of diamond, wherein an extremely hart and abrasion resistant structure comes into being.

The supply of coolant during the dressing process takes place via the coolant nozzle 17 for the dressing tool 7 and via the coolant nozzle 18 for the dressing bar 8.

LIST OF REFERENCE NUMERALS

1 Grinding worm
2 Tooth-shaped profile
3 Dressing device
4 Forming area (flank of the tooth-shaped profile)
5 Forming area (flank of the tooth-shaped profile)
6 Dressing spindle
7 Disk-shaped dressing tool
8 Dressing bar/dressing spacer
9 Dressing edge
10 Outer circumferential area of the grinding worm (tip portion)
11 Face side region
12 Contact surface
13 Contact surface
14 Clamping device
15 First abrasive area of the disk-shaped dressing tool
16 Second abrasive area of the disk-shaped dressing tool
17 Coolant nozzle
18 Coolant nozzle
C Axis of rotation of the grinding tool
B Axis of rotation of the dressing tool
L Length of the dressing bar
B Width of the grinding worm
X Radial infeed coordinate (direction of height of the profile)
Y Axial infeed coordinate

The invention claimed is:
1. Grinding machine for grinding of a gear or of a gear-like workpiece, comprising:
   a grinding worm with a tooth-shaped profile, which consists at least partly from a dressable abrasive material and which is arranged rotatably on a grinding spindle, so that it can rotate around an axis of rotation during grinding and
   a dressing device, with which at least a part of the forming areas of the grinding worm can be profiled,
   wherein the dressing device has a dressing spindle, which bears a disk-shaped dressing tool, so that it can rotate around an axis of rotation,
   wherein the grinding machine further has a dressing bar, which is non-rotatable and which has a dressing edge,
   wherein the form of the dressing edge corresponds at least partly to the ideal envelope of the grinding worm,
   wherein the dressing edge contacts only an outer circumferential area of the grinding worm, and
   wherein the dressing bar has a length which is at least the width of the grinding worm.
2. Grinding machine according to claim 1, wherein the dressing bar is arranged at the dressing device.

3. Grinding machine according to claim 1, wherein the dressing bar has a straight dressing edge.

4. Grinding machine according to claim 1, wherein the dressing bar has an arcuated dressing edge.

5. Grinding machine according to claim 1, wherein the dressing device or the grinding spindle or the dressing device and the grinding spindle are arranged on a slide, which allows to move the dressing edge to the outer circumferential area of the grinding worm.

6. Grinding machine according to claim 5, wherein the slide allows to move the dressing edge, wherein the dressing edge is arranged parallel to the axis of rotation (C) of the grinding spindle.

7. Grinding machine according to claim 1, wherein the dressing bar has a rectangular shape in its cross section.

8. Grinding machine according to claim 1, wherein the dressing device has at least two contact surfaces for the dressing bar in a face side region.

9. Grinding machine according to claim 8, wherein the dressing device has a clamping device for clamping of the dressing bar.

10. Grinding machine according claim 1, wherein the dressing bar consists of poly-crystalline diamond.

11. Grinding machine according to claim 1, wherein the grinding worm is a single-thread grinding worm.

12. Grinding machine according to claim 1, wherein the grinding worm is a multiple-thread grinding worm.

13. Grinding machine according to claim 1, wherein the disk-shaped dressing tool has such a profile, so that during the dressing of the forming areas of the grinding worm a substantial punctual contact is given between the dressing tool and the grinding worm.

14. Grinding machine according to claim 1, wherein the disk-shaped dressing tool has such a profile, so that during the dressing of the forming areas of the grinding worm a line contact is given between the dressing tool and the grinding worm.

* * * * *